(12) United States Patent
Choi et al.

(10) Patent No.: US 10,897,040 B2
(45) Date of Patent: Jan. 19, 2021

(54) ANODE HAVING DOUBLE-PROTECTION LAYER FORMED THEREON FOR LITHIUM SECONDARY BATTERY, AND LITHIUM SECONDARY BATTERY COMPRISING SAME

(71) Applicant: LG CHEM, LTD., Seoul (KR)

(72) Inventors: Heewon Choi, Daejeon (KR); Sangwook Woo, Daejeon (KR); Ohbyong Chae, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 21 days.

(21) Appl. No.: 15/780,983

(22) PCT Filed: Sep. 29, 2017

(86) PCT No.: PCT/KR2017/010924
§ 371 (c)(1),
(2) Date: Jun. 1, 2018

(87) PCT Pub. No.: WO2018/062934
PCT Pub. Date: Apr. 5, 2018

(65) Prior Publication Data
US 2018/0301693 A1    Oct. 18, 2018

(30) Foreign Application Priority Data

Sep. 30, 2016 (KR) .................. 10-2016-0127015
Sep. 29, 2017 (KR) .................. 10-2017-0126709

(51) Int. Cl.
*H01M 4/134* (2010.01)
*H01M 4/38* (2006.01)
(Continued)

(52) U.S. Cl.
CPC ........... *H01M 4/134* (2013.01); *H01M 4/366* (2013.01); *H01M 4/382* (2013.01); *H01M 4/62* (2013.01);
(Continued)

(58) Field of Classification Search
CPC ...... H01M 4/134; H01M 4/366; H01M 4/628; H01M 4/382; H01M 10/0525; H01M 10/4235
See application file for complete search history.

(56) References Cited

U.S. PATENT DOCUMENTS

2003/0003364 A1   1/2003   Mori et al.
2004/0058232 A1   3/2004   Kim et al.
(Continued)

FOREIGN PATENT DOCUMENTS

CN   1392624 A   1/2003
CN   1492523 A   4/2004
(Continued)

OTHER PUBLICATIONS

International Search Report for PCT/KR2017/010924 (PCT/IS/210) dated Jan. 24, 2018.
Extended European Search Report dated Dec. 14, 2018, for European Application No. 17856820.0.

*Primary Examiner* — Ula C Ruddock
*Assistant Examiner* — Thomas H. Parsons
(74) *Attorney, Agent, or Firm* — Birch, Stewart, Kolasch & Birch, LLP

(57) ABSTRACT

The present invention relates to a negative electrode for a lithium secondary battery having a double protective layer formed therein, and in particular, to a negative electrode for a lithium secondary battery having a polymer protective layer and a carbon-based protective layer formed therein, and a lithium secondary battery including the same. The lithium secondary battery including the negative electrode
(Continued)

according to the present invention is capable of enhancing battery performance and exhibiting stable performance by forming a stable lithium fluoride (LiF) layer and thereby preventing a loss of a solid electrolyte interface (SEI) layer. In addition, a cycle life property is enhanced during charge and discharge by absorbing dead lithium or lithium dendrite and thereby preventing an internal short circuit of the battery.

6 Claims, 6 Drawing Sheets

(51) Int. Cl.
- *H01M 10/0525* (2010.01)
- *H01M 4/62* (2006.01)
- *H01M 10/42* (2006.01)
- *H01M 4/36* (2006.01)
- *H01M 4/02* (2006.01)

(52) U.S. Cl.
CPC ....... *H01M 4/628* (2013.01); *H01M 10/0525* (2013.01); *H01M 10/4235* (2013.01); *H01M 2004/027* (2013.01); *H01M 2300/0082* (2013.01)

(56) References Cited

U.S. PATENT DOCUMENTS

| | | |
|---|---|---|
| 2006/0191794 A1 | 8/2006 | Jarvis |
| 2007/0148549 A1 | 6/2007 | Kobayashi et al. |
| 2009/0148769 A1 | 6/2009 | Volkov et al. |
| 2014/0272565 A1 | 9/2014 | Gronwald et al. |
| 2017/0226365 A1* | 8/2017 | Kobayashi ........... C09D 101/08 |

FOREIGN PATENT DOCUMENTS

| | | | |
|---|---|---|---|
| CN | 1511351 | A | 7/2004 |
| CN | 105122501 | A | 12/2015 |
| JP | 4673289 | B2 | 4/2011 |
| KR | 10-2004-0026208 | A | 3/2004 |
| KR | 10-0450208 | B1 | 9/2004 |
| KR | 10-0485336 | B1 | 4/2005 |
| KR | 10-0914842 | B1 | 3/2008 |
| KR | 10-1517886 | B1 | 5/2015 |
| KR | 10-2016-0034183 | A | 3/2016 |
| KR | 10-2016-0052351 | A | 5/2016 |
| KR | 10-1617836 | B1 | 5/2016 |
| KR | 20160052351 | * | 5/2016 |
| WO | WO 01/97304 | A1 | 12/2001 |
| WO | WO 02/095849 | A2 | 11/2002 |
| WO | WO 2007/111895 | A2 | 10/2007 |

* cited by examiner

【Figure 1】
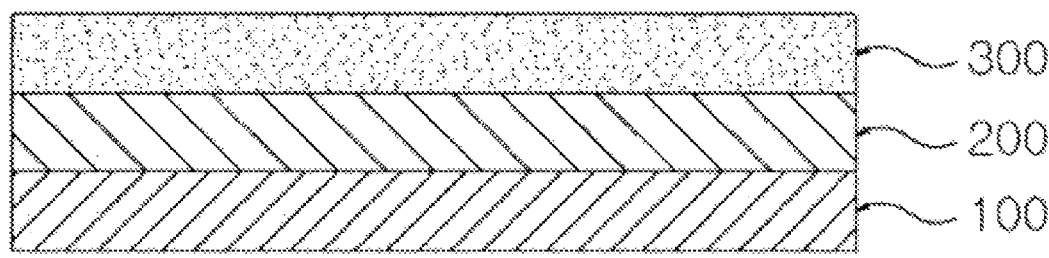
【Figure 2a】
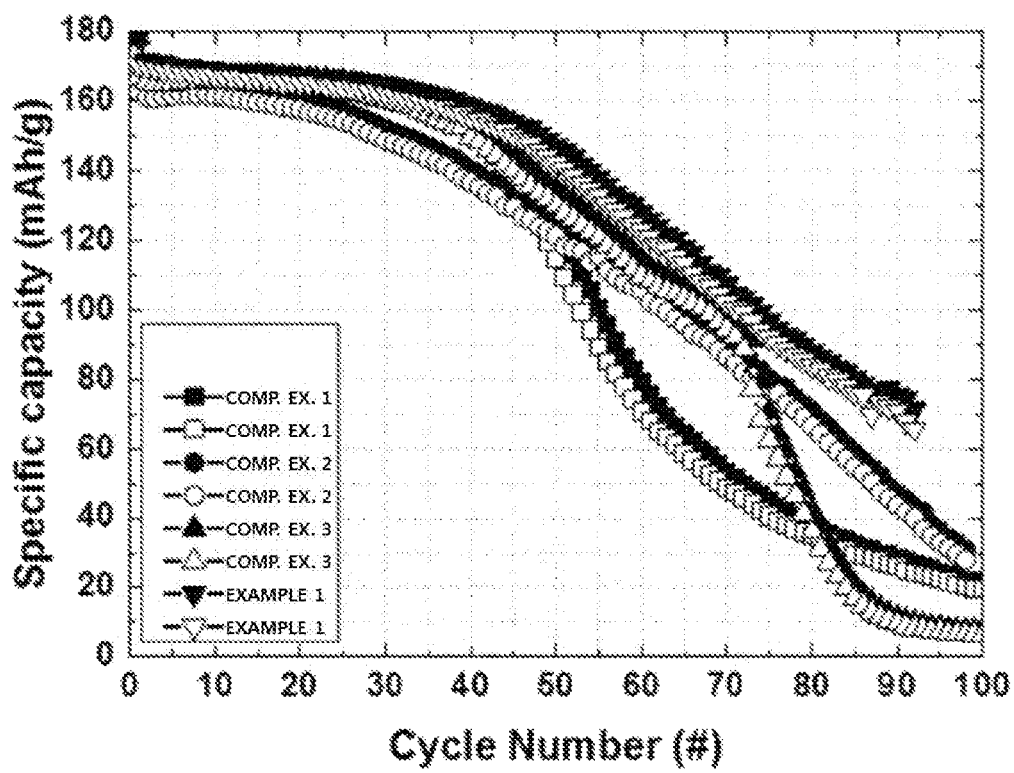

【Figure 2b】
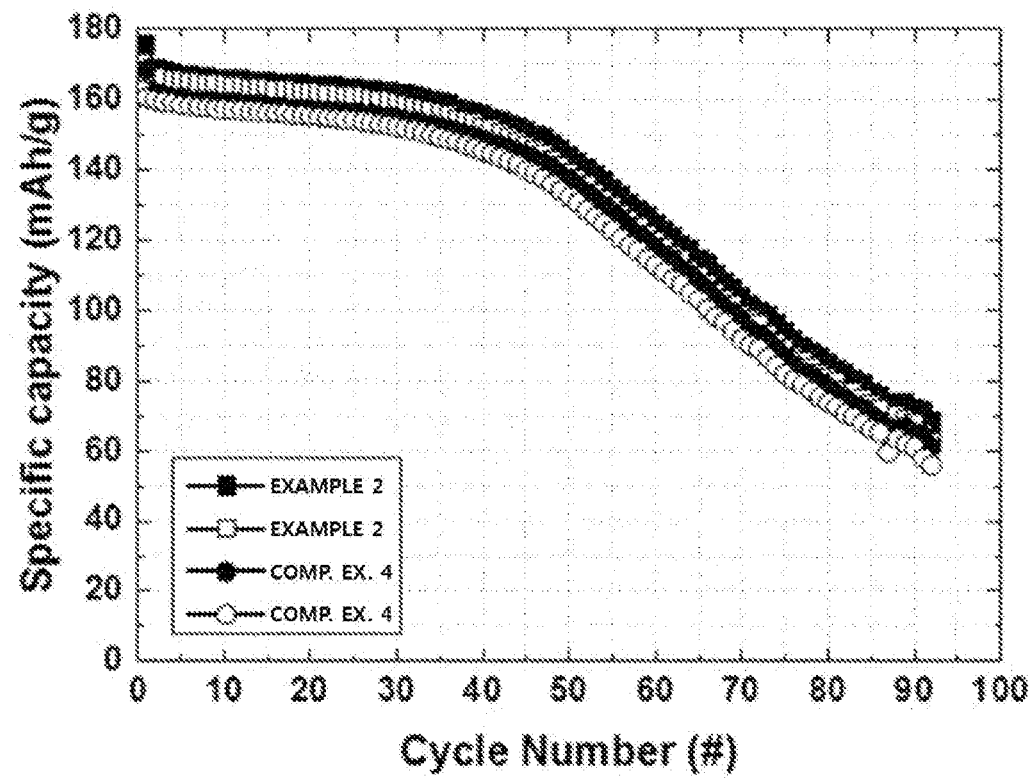
【Figure 3a】
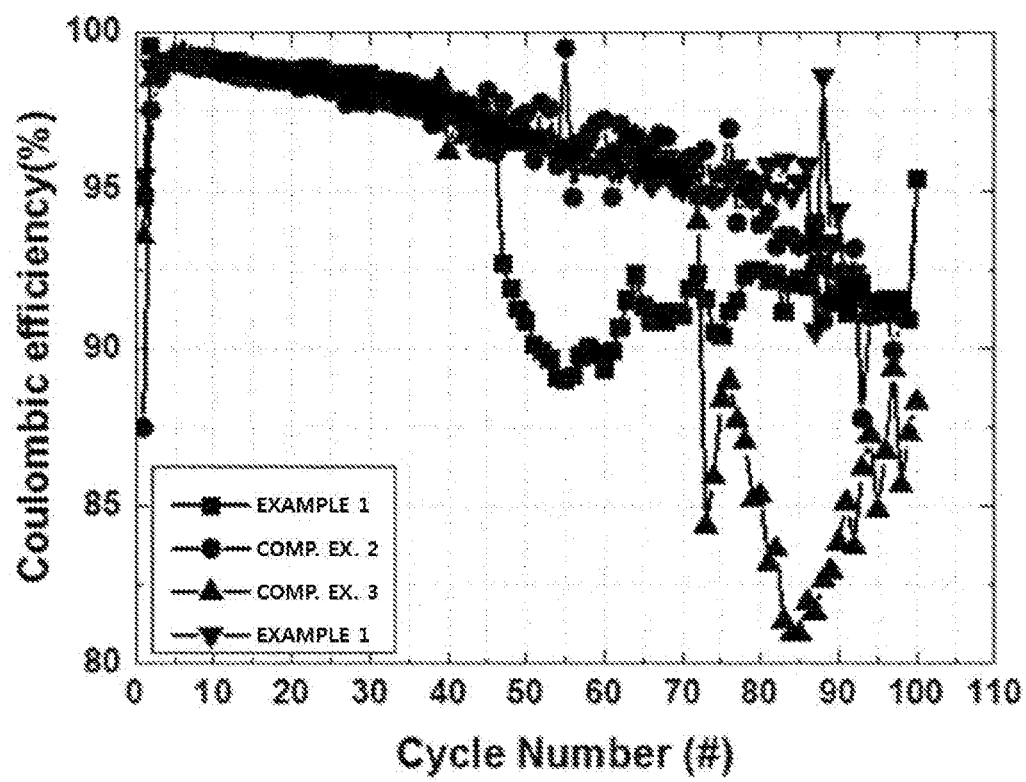

【Figure 3b】
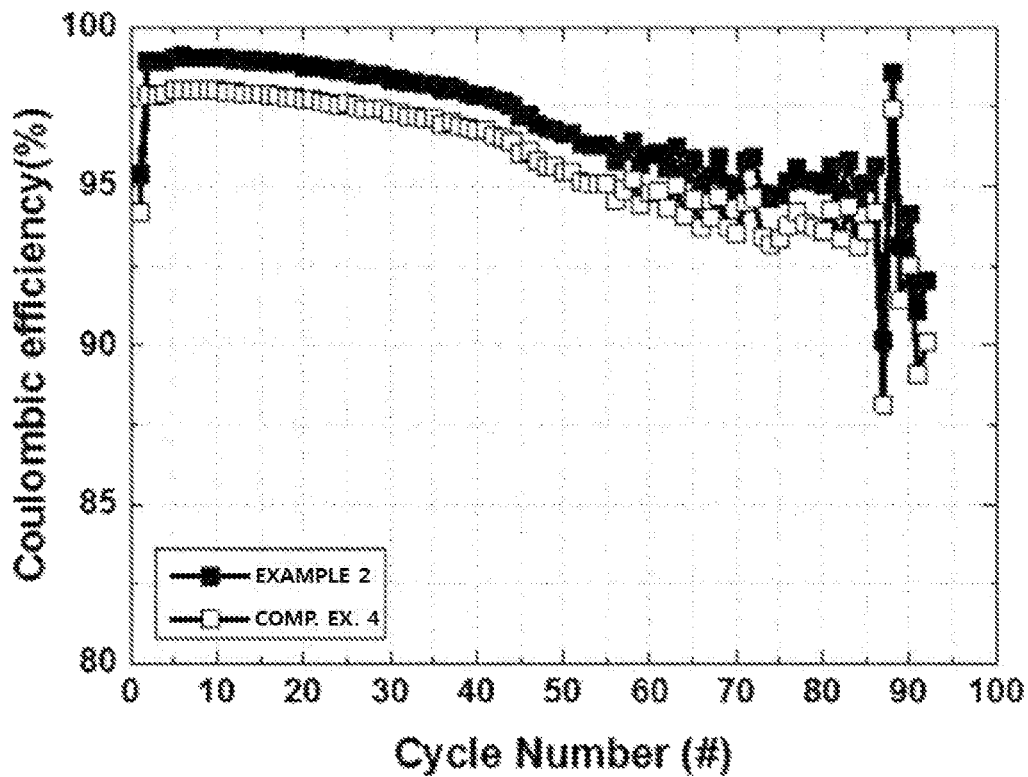
【Figure 4a】
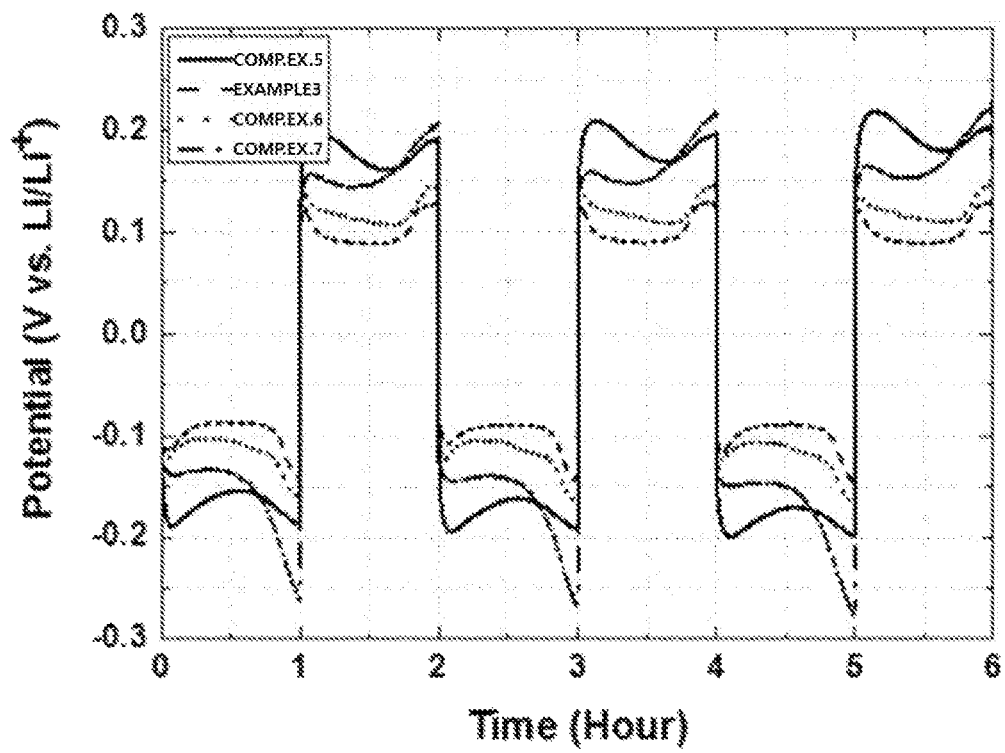

[Figure 4b]
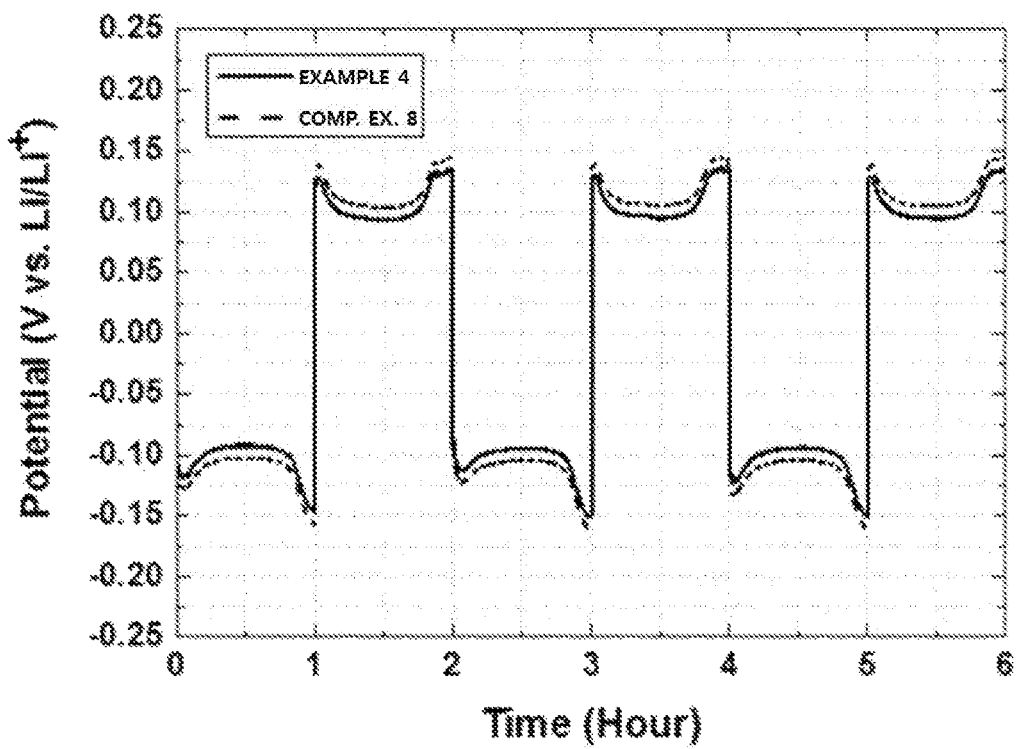
[Figure 5]
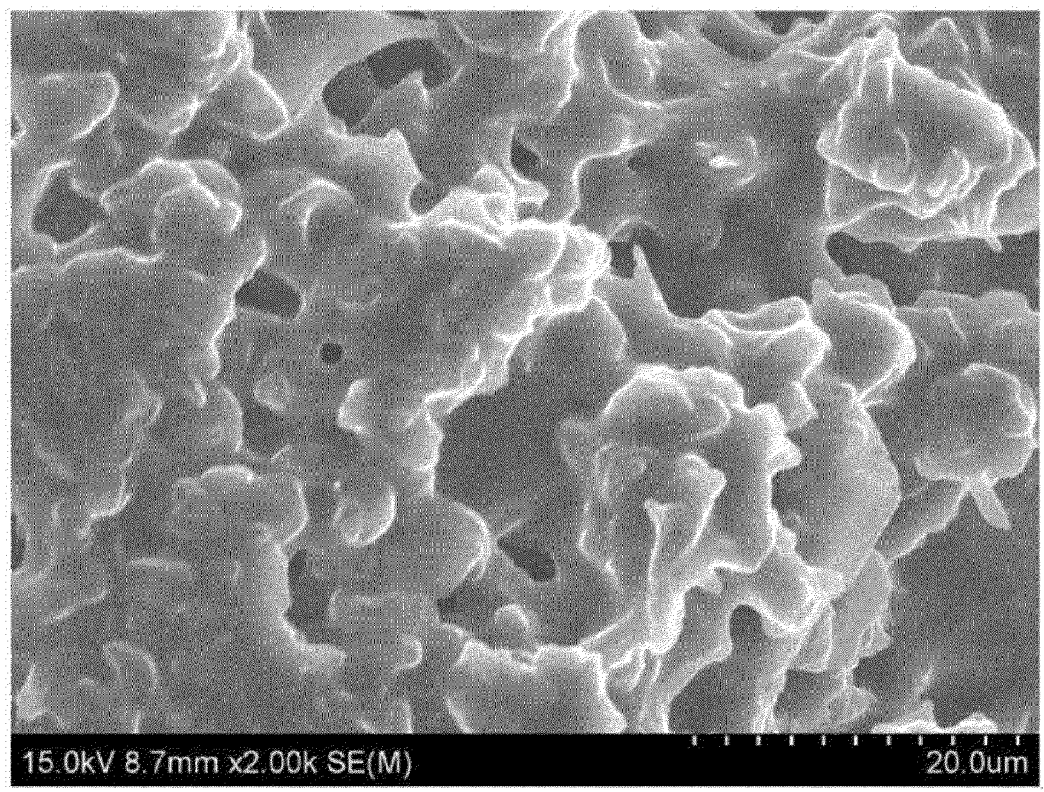

【Figure 6】
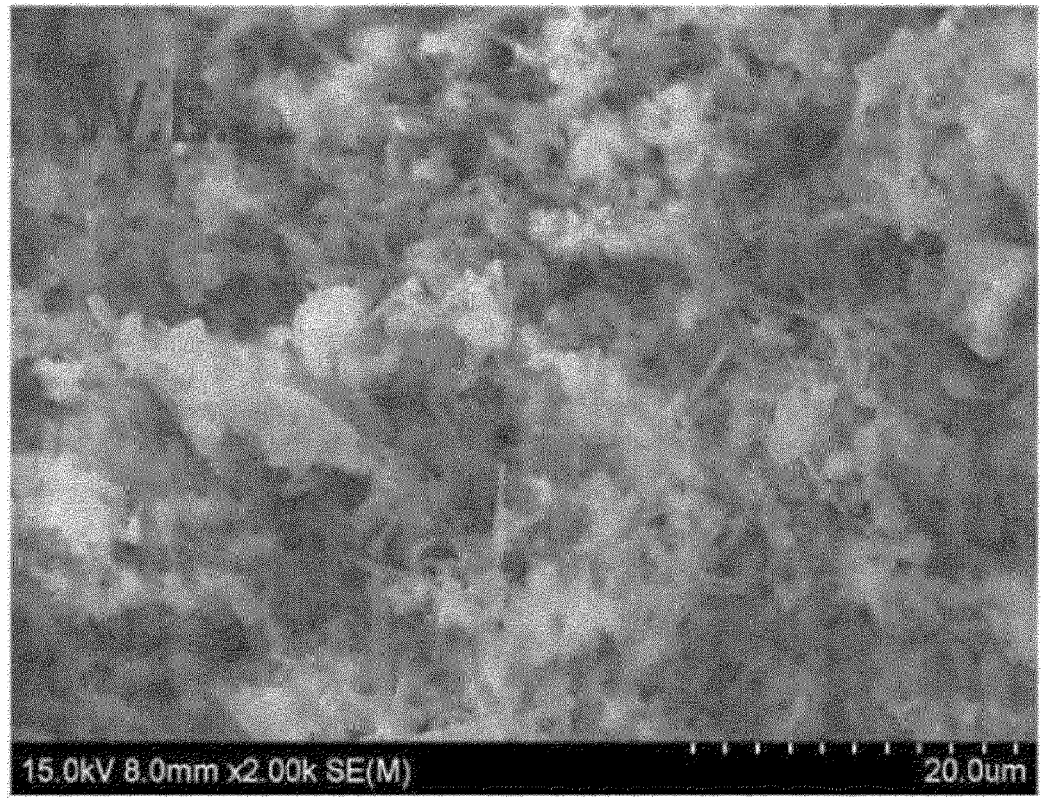
【Figure 7】
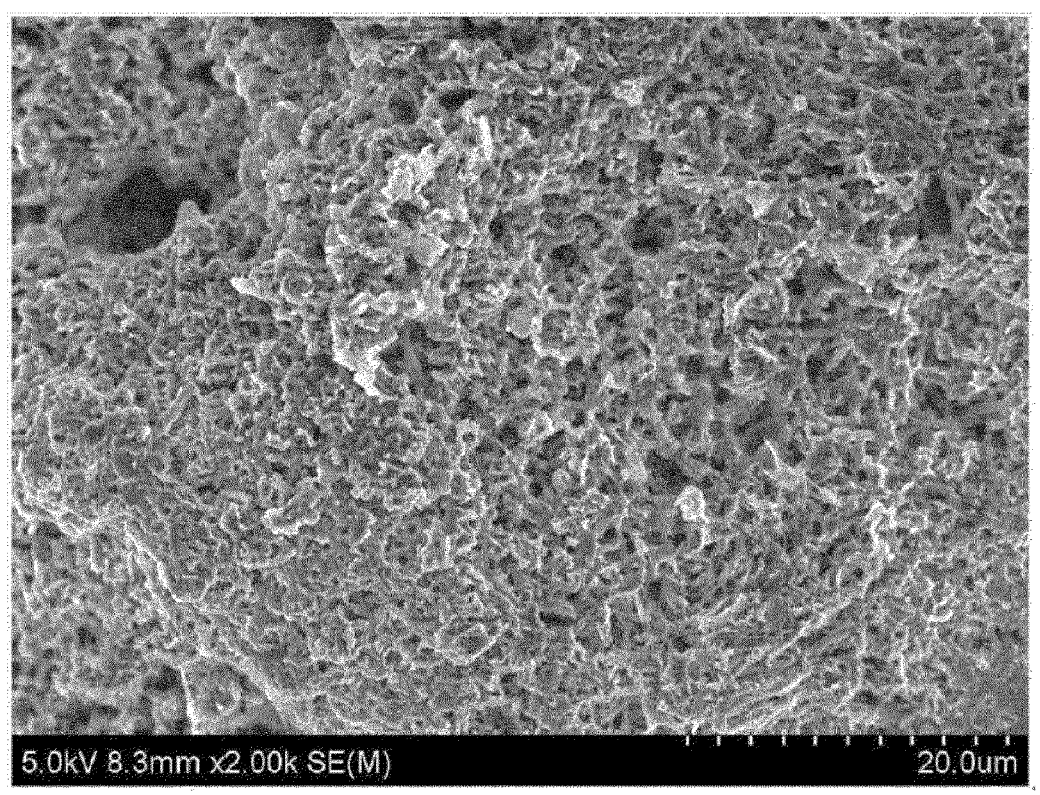

【Figure 8】
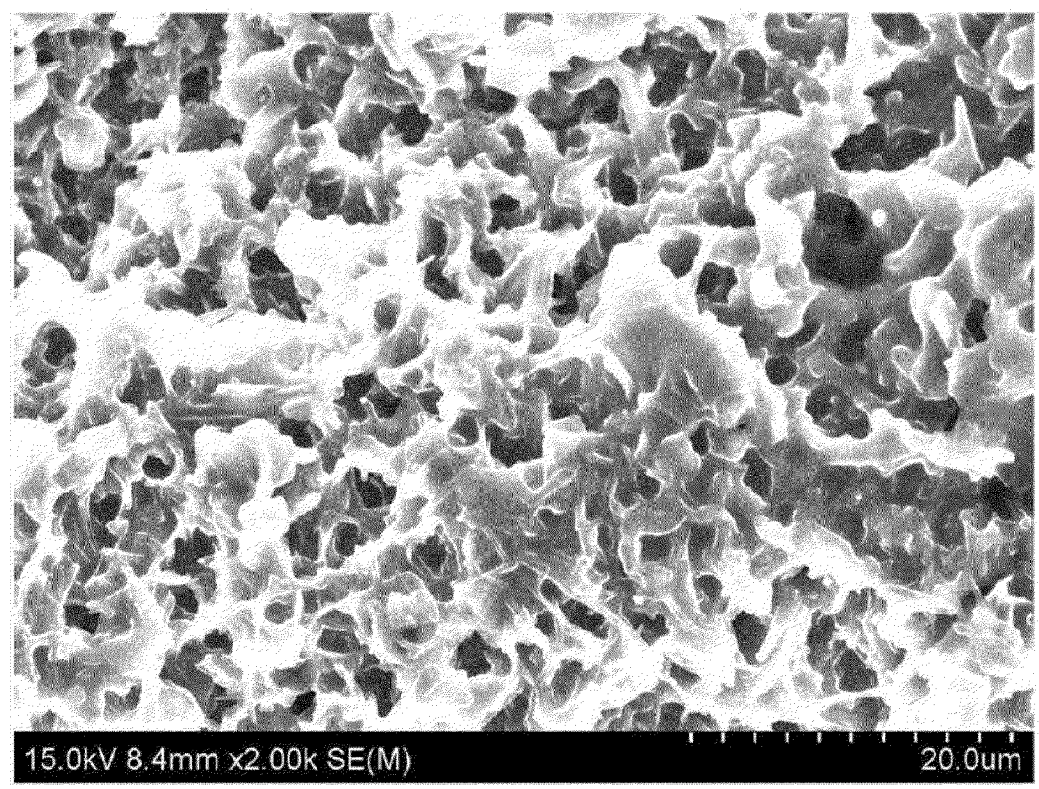

ANODE HAVING DOUBLE-PROTECTION LAYER FORMED THEREON FOR LITHIUM SECONDARY BATTERY, AND LITHIUM SECONDARY BATTERY COMPRISING SAME

TECHNICAL FIELD

This application claims priority to and the benefits of Korean Patent Application No. 10-2016-0127015, filed with the Korean Intellectual Property Office on Sep. 30, 2016, and Korean Patent Application No. 10-2017-0126709, filed with the Korean Intellectual Property Office on Sep. 29, 2017, the entire contents of which are incorporated herein by reference.

The present invention relates to a negative electrode for a lithium secondary battery having a double protective layer formed therein, and in particular, to a negative electrode for a lithium secondary battery having a polymer protective layer and a carbon-based protective layer formed therein, and a lithium secondary battery including the same.

BACKGROUND ART

Interests in energy storage technologies have been increasingly higher recently. As applications have expanded to energy of mobile phones, camcorders and notebook PCs, and furthermore, to electric vehicles, efforts on the research and development of electrochemical devices have been more and more materialized.

Electrochemical devices are fields receiving most attention in such aspects and among these, development of secondary batteries capable of charge and discharge have been the focus of attention, and developing such batteries has been progressed to research and development on the design of new electrodes and batteries for enhancing capacity density and energy efficiency.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous solution liquid electrolyte.

A lithium secondary battery is generally formed by embedding an electrode assembly including a positive electrode, a negative electrode and a separator provided between the positive electrode and the negative electrode into a battery case in a laminated or wound structure, and injecting a non-aqueous liquid electrolyte thereinto. In order to use a lithium electrode as a negative electrode, lithium foil is attached on a planar current collector.

In a lithium secondary battery, lithium ions coming from a positive electrode active material such as lithium metal oxide migrate to a negative electrode including a carbon-based material during initial charge, and inserted between layers of carbon-based materials. Herein, lithium is very reactive, and a liquid electrolyte and carbon react on the carbon-based material surface producing compounds such as $Li_2CO_3$, $Li_2O$ or $LiOH$. These compounds form a type of a solid electrolyte interface (SEI) layer on the carbon-based material surface. Such a SEI layer performs a role of an ion tunnel and passes through lithium ions only. As such an ion tunnel effect of the SEI layer, high molecular weight organic solvent molecules migrating with the lithium ions in the liquid electrolyte are inserted between layers of negative electrode active materials preventing the negative electrode structure from being destroyed. Accordingly, it has been reported that stable charge and discharge are maintained since the liquid electrolyte is not decomposed through preventing a contact between the liquid electrolyte and the negative electrode active material, and the amount of lithium ions in the liquid electrolyte is reversibly maintained.

In addition, lithium dendrite is formed due to irregular lithium formation and removal while progressing charge and discharge in a lithium secondary battery, which leads to a continuous capacity decrease. In order to resolve such issues, studies such as introducing a polymer protective layer or an inorganic solid protective layer to a lithium metal layer, increasing a concentration of a salt of a liquid electrolyte, or using proper additives have been currently progressed. However, effects of lithium dendrite suppression of such studies are insignificant. Accordingly, modifying a form of a lithium metal negative electrode itself or modifying a structure of a battery may become an effective alternative in resolving the problems.

PRIOR ART DOCUMENTS (Patent Document 1) Korean Patent Application Laid-Open Publication No. 2016-0052351 "Lithium metal electrode having stable protective layer and lithium secondary battery including the same"

DISCLOSURE

Technical Problem

An aspect of the present invention provides a highly useful negative electrode for a lithium secondary battery by suppressing lithium dendrite growth and controlling lithium metal reactivity.

Another aspect of the present invention provides a lithium secondary battery having excellent safety and life time properties according to repeated charge and discharge cycles while having high energy efficiency by using lithium metal as a negative electrode.

Technical Solution

According to an aspect of the present invention, there is provided a negative electrode for a lithium secondary battery including a lithium metal layer; a polymer protective layer formed on at least one surface of the lithium metal layer; and a carbon-based protective layer formed on the polymer protective layer.

According to another aspect of the present invention, there is provided a lithium secondary battery including the negative electrode.

Advantageous Effects

A lithium secondary battery including a negative electrode according to the present invention is capable of enhancing battery performance and exhibiting stable performance by forming a stable lithium fluoride (LiF) layer and thereby preventing a loss of a solid electrolyte interface (SEI) layer. In addition, a cycle life property is enhanced during charge and discharge by absorbing inactive lithium or lithium dendrite and thereby preventing an internal short circuit of the battery.

DESCRIPTION OF DRAWINGS

FIG. 1 is a sectional diagram of a negative electrode for a lithium secondary battery according to the present invention.

FIG. 2a shows electrochemical charge/discharge capacity and life time property data of lithium secondary batteries according to Example 1 and Comparative Examples 1 to 3 of the present invention. In FIG. 2a, filled figures represent absolute capacity during charge, and empty figures represent absolute capacity during discharge.

FIG. 2b shows electrochemical charge/discharge capacity and life time property data of lithium secondary batteries according to Example 2 and Comparative Example 4 of the present invention. In FIG. 2b, filled figures represent absolute capacity during charge, and empty figures represent absolute capacity during discharge.

FIG. 3a shows electrochemical charge/discharge efficiency data of lithium secondary batteries according to Example 1 and Comparative Examples 1 to 3 of the present invention.

FIG. 3b shows electrochemical charge/discharge efficiency data of lithium secondary batteries according to Example 2 and Comparative Example 4 of the present invention.

FIG. 4a shows an electrochemical charge/discharge overvoltage of lithium secondary batteries according to Example 3 and Comparative Examples 5 to 7 of the present invention.

FIG. 4b shows an electrochemical charge/discharge overvoltage of lithium secondary batteries according to Example 4 and Comparative Example 8 of the present invention.

FIG. 5 is a SEM image of a negative electrode for a lithium secondary battery according to Example 3 of the present invention.

FIG. 6 is a SEM image of a negative electrode for a lithium secondary battery according to Comparative Example 5 of the present invention.

FIG. 7 is a SEM image of a negative electrode for a lithium secondary battery according to Comparative Example 6 of the present invention.

FIG. 8 is a SEM image of a negative electrode for a lithium secondary battery according to Comparative Example 7 of the present invention.

BEST MODE

Hereinafter, the present invention will be described in detail so that those skilled in the art may readily implement the present invention. However, the present invention may be implemented in various different forms, and is not limited to the present specification.

In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

As shown in FIG. 1, the present invention provides a negative electrode for a lithium secondary battery including a lithium metal layer (100); a polymer protective layer (200) formed on at least one surface of the lithium metal layer (100); and a carbon-based protective layer (300) formed on the polymer protective layer (200). When laminating the polymer protective layer (200) and the carbon-based protective layer (300) in a double layer structure according to the present invention, electrochemical charge/discharge are more stable and an effect of improving cycle performance is maximized compared to when using the polymer protective layer or the carbon-based protective layer alone. Such a protective layer prevents formation of dendrite formed on the lithium metal surface during charge and thereby enhances a battery life time property, and may also prevent lithium metal oxidation by preventing a direct contact between the lithium metal surface and moisture or oxygen in the air.

Hereinafter, the lithium metal layer, the polymer protective layer and the carbon-based protective layer forming the negative electrode for a lithium secondary battery of the present invention will be described in detail.

Lithium Metal Layer

The lithium metal layer according to the present invention may be a lithium metal plate, or a metal plate having a lithium metal thin film formed on a negative electrode current collector. Herein, a method of forming the lithium metal thin film is not particularly limited, and known metal thin film forming methods such as a lamination method or a sputtering method may be used. In addition, assembling a battery with no lithium thin film on a current collector and then forming a metal lithium thin film on a metal plate by initial charge also belongs to the lithium metal plate of the present invention.

The negative electrode current collector is not particularly limited as long as it has high conductivity without inducing chemical changes to a battery, and may be selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and aluminum-cadmium alloys may be used as the alloy, and in addition thereto, baked carbon, nonconductive polymers of which surface is treated with a conductor, conductive polymers or the like may also be used. A copper thin plate is generally used as the negative electrode current collector.

The lithium metal plate may have its width adjusted depending on the form of an electrode so that the electrode is readily prepared. The lithium metal plate may have a thickness of 30 μm to 500 μm.

Polymer Protective Layer

The polymer protective layer according to the present invention performs a role of preventing non-uniform passivation layer formation by relatively lowering lithium metal layer reactivity and preventing the lithium metal layer from being directly exposed to a liquid electrolyte. Accordingly, the polymer protective layer is preferably formed with materials stable in the battery environment while having ion conductivity. As a result, the polymer protective layer according to the present invention preferably includes a fluorine-containing polymer, and therefore, adsorption of external moisture is inhibited as well as an amount of moisture in a carbon-based protective layer decreases resulting no concern of side reaction occurrences caused by moisture, and a loss of a solid electrolyte interface (SEI) layer formed on the carbon-based protective layer is prevented by forming a stable lithium fluoride (LiF) layer leading to enhancing battery performance and exhibiting stable performance.

Examples of the fluorine-containing polymer forming the polymer protective layer according to the present invention may be any one selected from among a polyvinylidene fluoride-hexafluoropropylene copolymer (PVDF-HFP), polytetrafluoroethylene (PTFE), polyvinylidene fluoride (PVDF), a tetrafluoroethylene-hexafluoropropylene copolymer (TFE-HFP), and mixtures, complexes or copolymers thereof.

The polymer protective layer may be formed on one surface or both surfaces of the lithium metal layer, and is preferably formed including one surface facing a liquid electrolyte. A method of forming the polymer protective layer is not particularly limited in the present invention, and various known methods may be used for the formation. Examples thereof may include methods of spin coating, doctor blade coating, dip coating, gravure coating, slit die coating, screen coating and the like, but are not limited thereto.

The polymer protective layer is formed to have a thickness of 0.1 µm to 20 µm, preferably 5 µm to 15 µm and more preferably 8 µm to 12 µm. When the polymer protective layer has a thickness of less than 0.1 µm, the function of protecting the lithium metal plate is difficult to sufficiently obtain, and a decrease in the battery capacity is caused due to a lack of ion conductivity and electron conductivity. The thickness being greater than 20 µm causes a decrease in the energy density compared to the same size.

According to one embodiment of the present application, the polymer protective layer may have ion conductivity of $10^{-6}$ S/cm or greater, and specifically $10^{-4}$ S/cm to $10^{-3}$ S/cm or less. When the polymer protective layer has ion conductivity in the above-mentioned range, ions may be smoothly transferred to the lithium electrode, and furthermore, battery performance may be enhanced.

According to the present invention, the polymer protective layer may include an organosulfur compound. The organosulfur compound may have a thiol group-containing monomer or polymer form, however, a monomer organosulfur compound contains more thiol groups and is preferred.

Specific examples of the organosulfur compound may include 2,5-dimercapto-1,3,4-thiadiazole, bis(2-mercaptoethyl)ether, N,N'-dimethyl-N,N'-dimercaptoethylene-diamine, N,N,N',N'-tetramercapto-ethylenediamine, polyethyleneimine derivatives, 2,4,6-trimercaptotriazole, N,N'-dimercapto-piperazine, 2,4-dimercaptopyrimidine, 1,2-ethanedithiol, bis(2-mercapto-ethyl)sulfide, or mixtures of two or more compounds thereof. Among these, 2,5-dimercapto-1,3,4-thiadiazole of the following Chemical Formula 1 is preferred.

The organosulfur compound preferably contains a thiol group at the end group, and the organosulfur compound having such a thiol group is advantageous for coating since it readily forms a complex with lithium metal. In addition, the organosulfur compound having such a thiol group contains S or N with large electronegativity in large quantities readily coordinating lithium ions, and may suppress dendrite formation by uniformly precipitating (depositing) lithium ions on the lithium metal surface.

The polymer protective layer preferably includes the organosulfur compound in 20% by weight to 50% by weight. When the amount of the organosulfur compound is less than 20% by weight, coating effects may not be sufficiently obtained, and when the amount is greater than 50% by weight, the polymer material content relatively decreases, which is not sufficient to secure target effects.

Carbon-Based Protective Layer

The carbon-based protective layer according to the present invention reacts with inactive lithium or lithium dendrite that is not involved in charge and discharge on the negative electrode, and absorbs in the manner of forming lithium-intercalated materials. As a result, an internal short circuit of a battery is prevented enhancing a cycle life property during charge and discharge.

When the lithium dendrite absorbing material is in contact with each other and aggregates, a conductive network is formed, and the conductive network is charged first before charging the negative electrode. As a result, the amount of dendrite absorption decreases causing decline in the battery cycle property. Accordingly, uniformly distributing the lithium dendrite absorbing material is preferred.

A carbon-based material included in the carbon-based protective layer is not limited in the type, however, one or more types selected from the group consisting of artificial graphite-based material, natural graphite-based material, low crystalline carbon-based material and combinations thereof may be included, and preferably, low crystalline carbon-based material is used.

The shape of the carbon-based material included in the carbon-based protective layer may be a globular shape, a plate shape, a fiber shape, an amorphous shape or the like, and is not particularly limited.

The content of the amorphous carbon-based material included in the carbon-based protective layer is preferably from 50% by weight to 80% by weight based on the total weight of the carbon-based protective layer. When the content is less than 50% by weight, the content of crystalline carbon-based increases reducing a specific surface area and making lithium ion intercalation/deintercalation difficult, and when the content is greater than 80% by weight, the amorphous carbon content is too much causing a problem of reducing overall capacity.

The particle diameter of the carbon-based material included in the carbon-based protective layer is not particularly limited, but is preferably from 0.01 µm to 20 µm. The particle diameter being greater than 20 µm has a problem of reducing electrode surface uniformity and reducing adhesive strength, and when the particle diameter is less than 0.01 µm, a conductive network may be formed with the occurrences of aggregation, and therefore, the particle diameter is preferably maintained in a 0.01 µm to 20 µm range.

In order to attach the carbon-based material to the polymer protective layer, the carbon-based protective layer may further include a binder. Examples of such a binder may include polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluorine rubber and various copolymers thereof.

In order to evenly coat the carbon-based material and the binder on the polymer protective layer, the carbon-based material and the binder may be prepared into a slurry state using a specific solvent. Herein, the solvent capable of being used may include dimethyl sulfoxide (DMSO), alcohol, N-methyl pyrrolidone (NMP), acetone, water or the like.

The carbon-based protective layer according to the present invention is formed to have a thickness of preferably 2 µm to 20 µm and more preferably 10 µm to 15 µm. When the carbon-based protective layer has a thickness of less than 2 µm, the carbon layer is too thin and may not properly perform a role of a protective layer, and when the thickness is greater than 20 µm, the whole negative electrode becomes too thick causing a problem of decreasing energy density.

A method of coating the prepared slurry including the carbon-based material on the polymer protective layer may be selected from among known methods or may employ a new proper method considering material properties and the like. For example, a method of distributing the composition for forming a negative electrode active material layer on a current collector, and uniformly dispersing the composition using a doctor blade or the like is preferred. In some cases, a method of carrying out distribution and dispersion in one process may also be used. In addition thereto, methods of die casting, comma coating or screen printing may also be used.

Lithium Secondary Battery

In the lithium secondary battery according to the present invention, constitutions other than structures and characteristics of the negative electrode described above may be prepared through known technologies by those skilled in the art, and hereinafter, specific descriptions will be provided.

The positive electrode according to the present invention may be prepared into a positive electrode form by filming a composition including a positive electrode active material, a conductor and a binder on a positive electrode current collector.

As the positive electrode active material, any one selected from the group consisting of $LiCoO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}CoyO_2$, $LiCo_{1-y}MnyO_2$, $LiNi_{1-y}MnyO_2$ ($0\leq y<1$), $Li(Ni_a Co_bMn_c)O_4$ ($0<a<2$, $0<b<2$, $0<c<2$, $a+b+c=2$), $LiMn_{2-z}NizO_4$, $LiMn_{2-z}CozO_4$ ($0<z<2$), $LiCoPO_4$ and $LiFePO_4$, or a mixture of two or more types thereof may be used. In addition, sulfides, selenides, halides and the like may also be used in addition to such oxides. In more preferred examples, the positive electrode active material may be $LiCoO_2$ suited for high output batteries.

The conductor is a component for further enhancing conductivity of the positive electrode active material, and nonlimiting examples thereof may include graphite such as natural graphite or artificial graphite; carbon black such as carbon black, acetylene black, ketjen black, channel black, furnace black, lamp black and thermal black; conductive fibers such as carbon fibers or metal fibers; fluorocarbon, aluminum and metal powders such as nickel powder; conductive whiskers such as zinc oxide and potassium titanate; conductive metal oxides such as titanium oxide; conductive materials such as polyphenylene derivatives, and the like.

The binder has functions of keeping the positive electrode active material on the positive electrode current collector, and organically linking the positive electrode active materials, and examples thereof may include polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The positive electrode composition may be coated on the positive electrode current collector using common methods known in the art, and for example, various methods such as a dipping method, a spray method, a roll coat method, a gravure printing method, a bar coat method, a die coating method, a comma coating method or a mixed method thereof may be used.

The positive electrode and the positive electrode composition that have gone through such a coating process go through solvent or dispersion medium evaporation, compactness of the coating layer and adhesion between the coating layer and the current collector using a drying process afterward. Herein, the drying is carried out using a common method, and is not particularly limited.

The separator is not particularly limited in the material and, as a material physically separating a positive electrode and a negative electrode and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte are particularly preferred. For example, a polyolefin-based porous membrane or non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be included.

As the non-woven fabric other than the polyolefin-based non-woven fabric described above, non-woven fabrics formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyetheretherketone, polyester and the like alone, or formed with a polymer mixing these may be used, and, as a fiber form forming a porous web, such a non-woven fabric includes a spunbond or meltblown form formed with long fibers.

The thickness of the separator is not particularly limited, but is preferably in a range of 1 μm to 100 μm and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

The electrolyte capable of being used in the present invention may be a non-aqueous liquid electrolyte or a solid electrolyte not reacting with lithium metal, but is preferably a non-aqueous electrolyte, and includes an electrolyte salt and an organic solvent.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$ $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3 SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone, or as a mixture of two or more types. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous liquid electrolyte may be injected at a proper stage in an electrochemical device manufacturing process depending on a manufacturing process and required properties of a final product. In other words, the non-aqueous liquid electrolyte may be injected at a stage prior to assembling an electrochemical device or at a final stage of electrochemical device assembly.

The lithium secondary battery according to the present invention may go through lamination (stack) and folding processes of a separator and an electrode in addition to winding, a general process. In addition, the battery case may be a cylinder-type, a square-type, a pouch-type, a coin-type or the like.

As described above, the lithium secondary battery according to the present invention stably exhibits excellent discharge capacity, an output property and a capacity retention rate, and therefore, is useful in the fields of portable devices such as mobile phones, notebook computers or digital cameras, electric vehicles such as hybrid electric vehicles (HEV), and the like.

According to another embodiment of the present invention, there is provided a battery module including the lithium secondary battery as a unit cell, and a battery pack including the same. The battery module or the battery pack may be used as a power supply of any one or more medium to large-sized devices such as power tools; electric vehicles including electric vehicles (EV), hybrid electric vehicles (HEV) and plug-in hybrid electric vehicles (PHEV); or systems for power storage.

Hereinafter, the present invention will be described in detail with reference to examples in order to specifically describe the present invention. However, the examples according to the present specification may be modified to various different forms, and the scope of the present invention is not construed as being limited to the examples described below. The examples of the present invention are provided in order to more fully describe the present invention for those having average knowledge in the art.

EXAMPLE 1

LCO was used as a positive electrode. As a negative electrode, a PVDF-HFP polymer protective layer was coated to a thickness of 8 µm to 12 µm on a Li metal surface having a thickness of 150 µm, and a carbon-based protective layer of a hard carbon material (using amorphous hard carbon, Carbotron-P manufactured by Kureha Corporation) having a particle size ($D_{50}$) of approximately 5 µm and having excellent electrical/ion conductivity was coated to a thickness of 10 µm to 15 µm on the polymer protective layer. After providing a polyolefin separator between the positive electrode and the negative electrode, a liquid electrolyte prepared by dissolving 1 M $LiPF_6$ in a solvent mixing ethylene carbonate (EC) and diethyl carbonate (DEC) in a volume ratio of 50:50 was injected thereto to manufacture a coin-type half-cell.

Comparative Example 1

A coin-type half-cell was manufactured in the same manner as in Example 1 except that a negative electrode without coating a polymer protective layer and a carbon-based protective layer on a Li metal surface having a thickness of 150 µm was used.

Comparative Example 2

A coin-type half-cell was manufactured in the same manner as in Example 1 except that a negative electrode coating only a PVDF-HFP polymer protective layer to a thickness of 8 µm to 12 µm on a Li metal surface having a thickness of 150 µm was used.

Comparative Example 3

A coin-type half-cell was manufactured in the same manner as in Example 1 except that a negative electrode coating a carbon-based protective layer of a hard carbon material (using amorphous hard carbon, Carbotron-P manufactured by Kureha Corporation) having a particle size ($D_{50}$) of approximately 5 µm and having excellent electrical/ion conductivity to a thickness of 10 µm to 15 µm on a Li metal surface having a thickness of 150 µm without a polymer protective layer.

EXAMPLE 2

A coin-type half-cell was manufactured in the same manner as in Example 1 except that PTFE was used as the polymer protective layer instead of PVDF-HFP.

Comparative Example 4

A coin-type half-cell was manufactured in the same manner as in Example 1 except that PVA was used as the polymer protective layer instead of PVDF-HFP.

EXAMPLE 3

A coin-type half-cell was manufactured in the same manner as in Example 1 except that Li metal having a thickness of 150 μm was used as the positive electrode instead of LCO.

Comparative Example 5

A coin-type half-cell was manufactured in the same manner as in Example 3 except that the same negative electrode as in Comparative Example 1 was used.

Comparative Example 6

A coin-type half-cell was manufactured in the same manner as in Example 3 except that the same negative electrode as in Comparative Example 2 was used.

Comparative Example 7

A coin-type half-cell was manufactured in the same manner as in Example 3 except that the same negative electrode as in Comparative Example 3 was used.

EXAMPLE 4

A coin-type half-cell was manufactured in the same manner as in Example 3 except that the same negative electrode as in Example 2 was used.

Comparative Example 8

A coin-type half-cell was manufactured in the same manner as in Example 3 except that the same negative electrode as in Comparative Example 4 was used.

Experimental Example 1

Measurement of Electrochemical Charge/Discharge Capacity, Life Time Property and Capacity Efficiency Charge/discharge capacity, a life time (cycle) property, and capacity efficiency of Example 1 and Comparative Examples 1 to 3 were measured, and the results are shown in FIGS. 2a and 3a. According to FIGS. 2a and 3a, it was identified that Example 1 had superior charge/discharge capacity and capacity efficiency compared to Comparative Examples 1 to 3 as the cycle progressed.

In addition, charge/discharge capacity, a life time (cycle) property, and capacity efficiency of Example 2 and Comparative Example 4 were measured, and the results are shown in FIGS. 2b and 3b. According to FIGS. 2b and 3b, it was identified that Example 2 had superior charge/discharge capacity and capacity efficiency compared to Comparative Example 4 as the cycle progressed.

Experimental Example 2

Measurement of Electrochemical Charge/Discharge Overvoltage Behavior

An overvoltage generated during a charge/discharge process of each of Example 3 and Comparative Examples 5 to 7 was measured, and the results are shown in FIG. 4a.

According to FIG. 4a, it was identified that Example 3 had a significantly reduced overvoltage compared to Comparative Examples 5 to 7.

An overvoltage generated during a charge/discharge process of each of Example 4 and Comparative Example 8 was measured, and the result are shown in FIG. 4b. According to FIG. 4b, it was identified that Example 4 had a significantly reduced overvoltage compared to Comparative Example 8.

Experimental Example 3

Identification of Dendrite Morphology after Electrochemical Charge/Discharge

Dendrite morphology was identified through measuring SEM by dissembling the cell after the charge/discharge process of Example 3 and Comparative Examples 5 to 7, and the results are shown in FIGS. 5 to 8. As shown in FIG. 5, it was identified that the dendrite of Example 3 had uniform current density distribution and the form of lithium being reduced and deposited was porous and broad. Meanwhile, as shown in FIGS. 6 to 8, it was identified that in Comparative Examples 5 to 7, the form of lithium being reduced and deposited was non-uniform and vertical as current density distribution was not uniform and the current was focused on one side.

REFERENCE NUMERAL

100. Lithium Metal Layer
200. Polymer Protective Layer
300. Carbon-Based Protective Layer

The invention claimed is:

1. A negative electrode for a lithium secondary battery having a double protective layer formed therein, the negative electrode comprising:
    a lithium metal layer;
    a polymer protective layer formed on at least one surface of the lithium metal layer,
    wherein the polymer protective layer consists of a fluorine-containing polymer; and
    a carbon-based protective layer formed on the polymer protective layer,
    wherein the carbon-based protective layer comprises an amorphous carbon-based material present in 50% by weight to 80% by weight based on a total weight of the carbon-based protective layer.

2. The negative electrode for a lithium secondary battery of claim 1, wherein the fluorine-containing polymer is at least one selected from the group consisting of a polyvinylidene fluoride-hexafluoropropylene copolymer (PVDF-HFP), polytetrafluoroethylene (PTFE), polyvinylidene fluoride (PVDF), a tetrafluoroethylene-hexafluoropropylene copolymer (TFE-HFP) and combinations thereof.

3. The negative electrode for a lithium secondary battery of claim 1, wherein the polymer protective layer has a thickness of 0.1 μm to 50 μm.

4. The negative electrode for a lithium secondary battery of claim 1, wherein the carbon-based protective layer includes a carbon-based material having a particle diameter of 0.01 μm to 20 μm.

5. The negative electrode for a lithium secondary battery of claim 1, wherein the carbon-based protective layer has a thickness of 2 μm to 20 μm.

6. A lithium secondary battery comprising the negative electrode of claim 1.

* * * * *